US009148231B2

(12) United States Patent
Morita et al.

(10) Patent No.: US 9,148,231 B2
(45) Date of Patent: Sep. 29, 2015

(54) OPTICAL RECEIVER AND OPTICAL TRANSMISSION SYSTEM

(75) Inventors: Hiroshi Morita, Kanagawa (JP);
Hideyuki Suzuki, Kanagawa (JP);
Katsushi Hanaoka, Kanagawa (JP);
Kenya Kondo, Fukuoka (JP)

(73) Assignee: Sony Corpoation, Tokyo (JP)

( * ) Notice: Subject to any disclaimer, the term of this patent is extended or adjusted under 35 U.S.C. 154(b) by 563 days.

(21) Appl. No.: 13/064,981

(22) Filed: Apr. 29, 2011

(65) Prior Publication Data

US 2011/0311232 A1 Dec. 22, 2011

(30) Foreign Application Priority Data

Jun. 18, 2010 (JP) ................................. 2010-139586

(51) Int. Cl.
*H04B 10/06* (2006.01)
*H04B 10/69* (2013.01)

(52) U.S. Cl.
CPC .................................. *H04B 10/6973* (2013.01)

(58) Field of Classification Search
CPC .................................................. H04B 10/6973
USPC .................................................. 398/214, 202
See application file for complete search history.

(56) References Cited

U.S. PATENT DOCUMENTS

| | | | | |
|---|---|---|---|---|
| 5,013,903 A * | 5/1991 | Kasper | 250/214 A |
| 5,864,416 A * | 1/1999 | Williams | 398/202 |
| 5,889,605 A * | 3/1999 | Claverie et al. | 398/202 |
| 6,404,281 B1 * | 6/2002 | Kobayashi | 330/85 |
| 6,538,790 B1 * | 3/2003 | Hatakeyama et al. | 398/202 |
| 6,919,609 B2 * | 7/2005 | Lindemann et al. | 257/443 |
| 7,183,859 B2 * | 2/2007 | Visocchi et al. | 330/308 |
| 7,330,668 B2 * | 2/2008 | Heimlicher | 398/202 |
| 7,388,435 B2 * | 6/2008 | Neenan et al. | 330/308 |
| 7,391,005 B2 | 6/2008 | Sherazi et al. | |
| 7,406,268 B2 * | 7/2008 | Schrodinger | 398/202 |
| 7,418,213 B2 * | 8/2008 | Denoyer | 398/210 |
| 7,567,192 B2 * | 7/2009 | Colmer | 341/143 |

(Continued)

FOREIGN PATENT DOCUMENTS

| | | |
|---|---|---|
| JP | 2003-332855 A | 11/2003 |
| JP | 2008-507943 A | 3/2008 |
| JP | 2009-505457 A | 2/2009 |

OTHER PUBLICATIONS

Japanese Office Action issued Jan. 14, 2014 for corresponding Japanese Application No. 2010-139586.

*Primary Examiner* — Ken Vanderpuye
*Assistant Examiner* — Amritbir Sandhu
(74) *Attorney, Agent, or Firm* — Michael Best & Friedrich LLP

(57) ABSTRACT

Disclosed herein is an optical receiver including: a light receiving element configured to have an anode and a cathode and generate a photocurrent dependent on received signal light; a current-voltage conversion circuit configured to be connected to the anode of the light receiving element and convert the photocurrent to a voltage signal; and a capacitive passive element configured to have a first electrode and a second electrode. The cathode of the light receiving element is connected to the first electrode of the capacitive passive element, and the second electrode of the capacitive passive element is connected to a reference potential of the current-voltage conversion circuit and the second electrode is not coupled to objects other than a reference potential terminal of the current-voltage conversion circuit.

20 Claims, 15 Drawing Sheets

(56) References Cited

U.S. PATENT DOCUMENTS

| | | | |
|---|---|---|---|
| 8,059,973 B2* | 11/2011 | Douma | 398/209 |
| 8,103,164 B2* | 1/2012 | Lalonde | 398/23 |
| 8,112,002 B2* | 2/2012 | Uemura et al. | 398/183 |
| 2003/0122533 A1* | 7/2003 | Prescott | 323/313 |
| 2003/0161640 A1* | 8/2003 | Kimura | 398/202 |
| 2004/0124927 A1* | 7/2004 | Jung et al. | 330/308 |
| 2005/0095013 A1* | 5/2005 | Tsai | 398/209 |
| 2005/0175359 A1* | 8/2005 | Tsai | 398/202 |
| 2005/0194955 A1* | 9/2005 | Moran | 323/315 |
| 2005/0281565 A1* | 12/2005 | Duanmu et al. | 398/214 |
| 2006/0034621 A1* | 2/2006 | Denoyer | 398/208 |
| 2008/0205897 A1* | 8/2008 | Neenan et al. | 398/136 |
| 2009/0285579 A1* | 11/2009 | Neenan et al. | 398/136 |

* cited by examiner

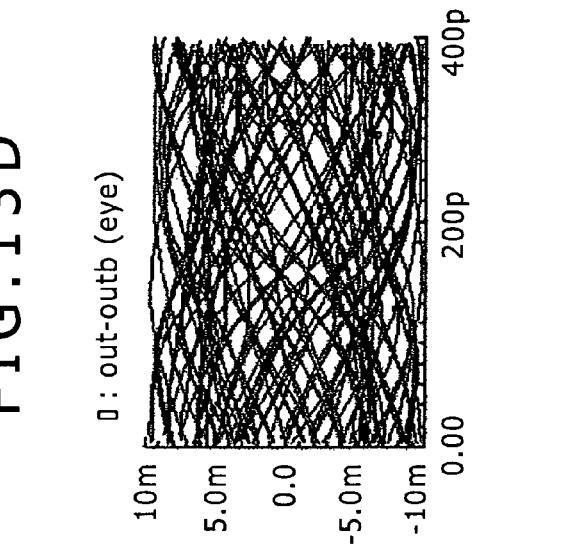
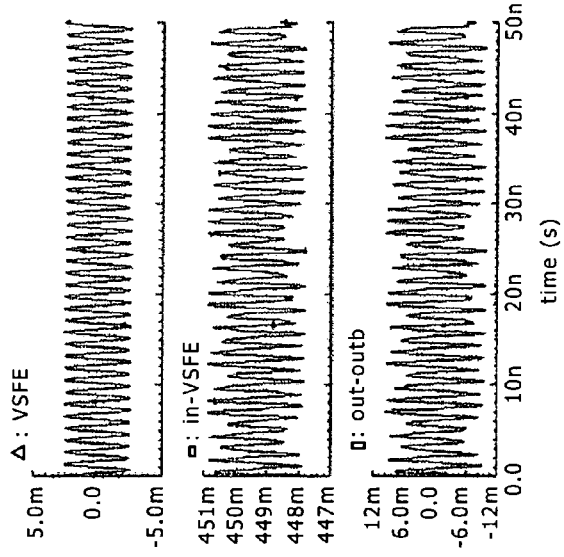

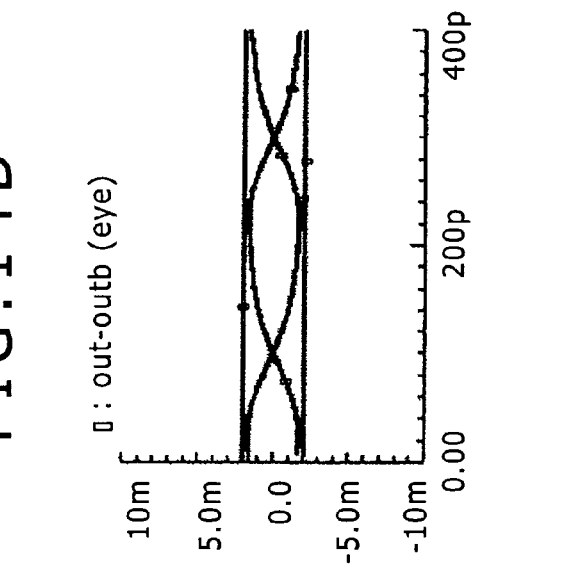
FIG.14D
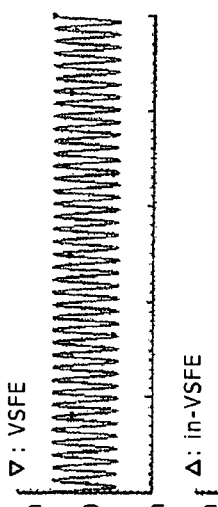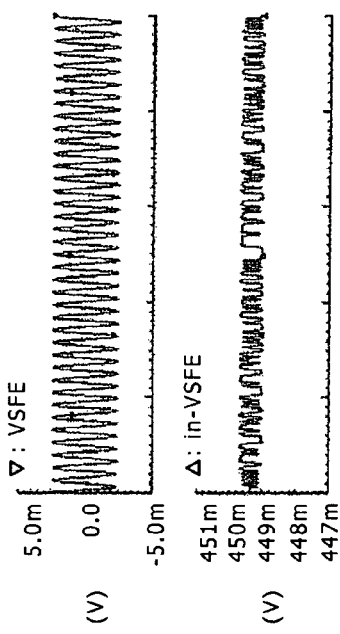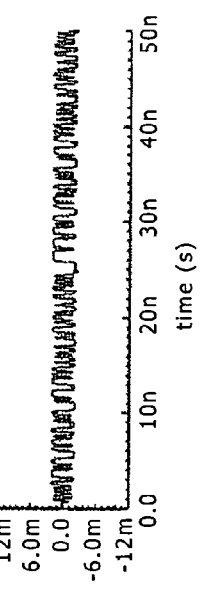
FIG.14A
FIG.14B
FIG.14C

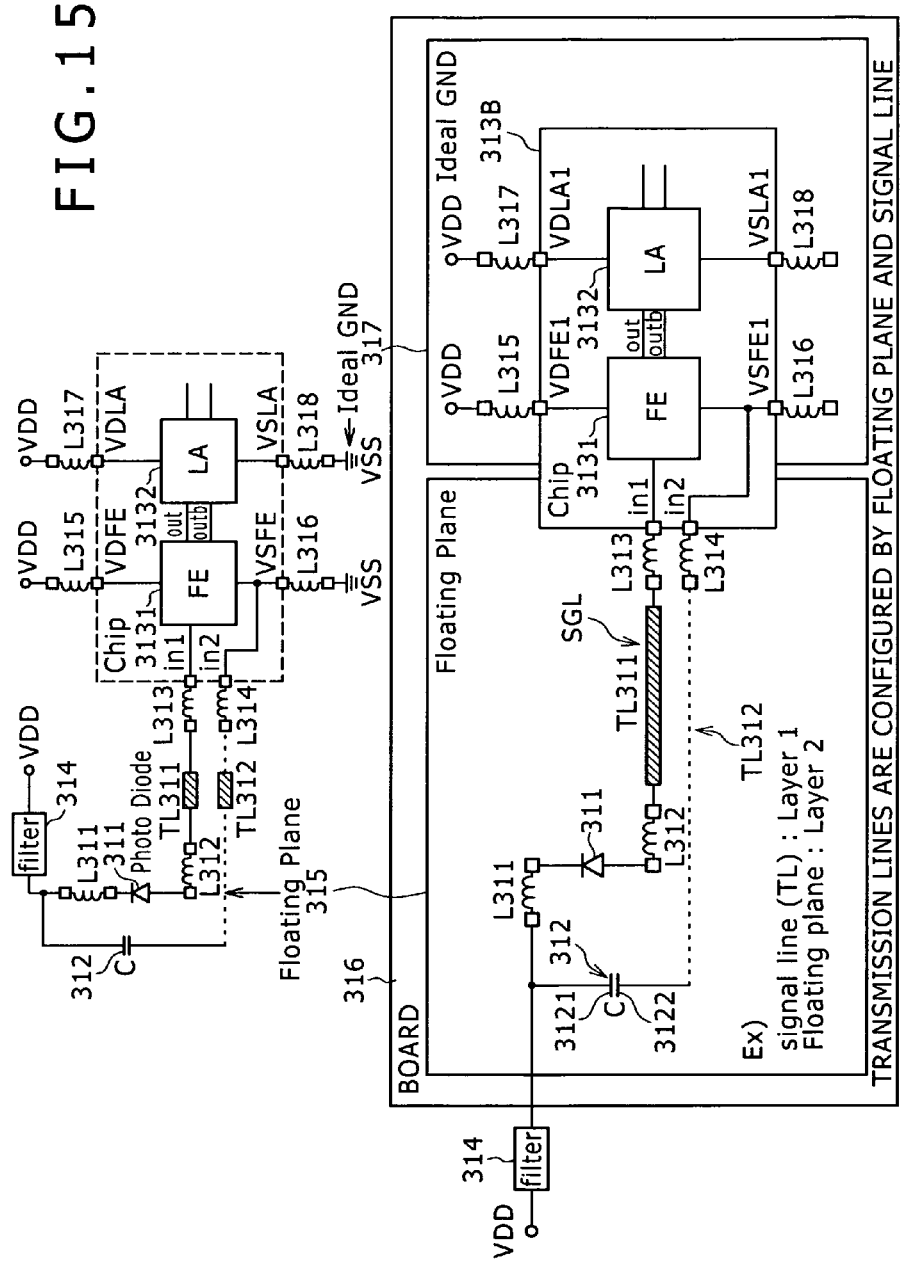

OPTICAL RECEIVER AND OPTICAL TRANSMISSION SYSTEM

BACKGROUND OF THE INVENTION

1. Field of the Invention

The present invention relates to an optical receiver applied to an optical transmission system, and an optical transmission system.

2. Description of the Related Art

A transimpedance amplifier (TIA) to convert current to a voltage is used in an optical transmission system.

The optical transmission system refers to a system in which data arising from optical conversion of an electrical signal is transmitted from an optical transmitter (TX) and the optical data received by an optical receiver (RX) is converted to an electrical signal.

A photodiode (PD) converts the optical data sent from the optical transmitter (TX) to a current and the TIA is used to convert this current to a differential voltage.

The electrical signal output from a driver of the optical transmitter (TX) is converted to an optical signal by an electro-optical conversion element, a laser diode (LD) or a vertical cavity surface emitting laser (VCSEL). This optical signal passes through an optical fiber to be subjected to opto-electrical conversion by the PD of the optical receiver (RX).

In the communication from the optical transmitter (TX) to the optical receiver (RX), power loss at the connection part of the optical fiber and in the electrical/optical conversion and the optical/electrical conversion is large and the output current of the PD has significantly-low amplitude in some cases. Thus, it is preferable for the TIA to have a high signal-to-noise ratio (SNR).

SUMMARY OF THE INVENTION

FIG. 1 is a diagram showing a first configuration example of the optical receiver and is a diagram showing a method for connecting a PD and a TIA generally used.

FIG. 2 is a diagram showing a second configuration example of the optical receiver.

FIG. 3 is a diagram showing a third configuration example of the optical receiver.

An optical receiver 1 of FIG. 1 has a photodiode (PD) 2 as a light receiving element, a capacitor (C) 3 as a capacitive passive element, a TIA 4 as a current-voltage conversion circuit, and a filter 5.

In FIG. 1, L1 to L5 denote parasitic inductors and ND1 denotes a node.

The TIA 4 in FIG. 1 includes an input terminal "in," a power supply terminal VDEF connected to a power supply potential VDD, a reference potential terminal VSFE connected to a reference potential VSS, and a front end (FE) part 41 connected to the input terminal "in," the power supply terminal VDEF, and the reference potential terminal VSFE.

In a TIA 4A in FIG. 2 and a TIA 4B in FIG. 3, a limiting amplifier (LA) 42 is disposed at the output stage of the FE part 41 in addition to the configuration of FIG. 1.

The cathode of the PD 2 is connected to the power supply potential VDD via the filter 5 and to a first electrode 31 of the capacitor 3, and a second electrode 32 of the capacitor 3 is connected to the reference potential VSS. The node ND1 is formed by these connection points.

The parasitic inductor L1 exists between the cathode of the PD 2 and the node ND1.

The anode of the PD 2 is connected to the input terminal "in" of the TIA 4. The parasitic inductors L2 and L3 exist between the anode of the PD 2 and the input terminal "in" of the TIA 4.

The parasitic inductor L4 exists between the power supply terminal VDFE of the TIA 4 and the power supply potential VDD, and the parasitic inductor L5 exists between the reference potential terminal VSFE and the reference potential VSS.

In the optical receiver 1 of FIG. 1, the PD 2 receives an optical signal and the FE part 41 of the TIA 4 receives the current obtained by electrical conversion and converts it to a differential voltage.

The modulation current of the output of the PD 2 is only about several tens of microamperes (μA) when the power is weak. Therefore, if a 20-μA current is received by 50Ω as the input impedance of the FE part 41, the modulation voltage of the terminal "in" is only about 1 mV and thus is easily buried in noise.

Because the TIA 4 amplifies low amplitude, the LA 42 is frequently provided in addition to the FE part 41 as shown in FIG. 2.

Self-generated noise is produced by this LA 42 and various circuits on the TIA chip and applied to a reference potential terminal VSFELA.

On the other hand, noise at the reference potential terminal VSFELA is not correctly transmitted to the terminal "in" due to the parasitic capacitance of the PD 2 and the FE part 41, and so forth. Therefore, noise is added to the terminal "in" from the viewpoint of the reference potential terminal VSFELA as the basis and the SNR is deteriorated.

Therefore, a configuration in which the power supply and reference potentials are separated for only the FE part 41 as shown in FIG. 3 is generally preferred.

However, because elements on the chip are coupled to each other by the board and interconnects actually, the noise propagated to the reference potential terminal VSFE is not completely removed. For the TIA, which should have a high SNR, this noise that is not completely removed is a problem.

Furthermore, as the number of channels increases, the amount of noise propagated to the reference potential terminal VSFE increases. In the case of an application with a larger number of channels, the influence of the noise increases and causes a more serious problem.

FIG. 4 is a diagram showing a fourth configuration example of the optical receiver and is a diagram showing a configuration in which the PD and the TIA chip are coupled to each other by a transmission line.

In an optical receiver 1C of FIG. 4, the anode of the PD 2 is connected to the input terminal "in" of the TIA 4B by a transmission line TL1.

In this case, similarly to the above description, if noise is applied to the reference potential terminal VSFE, the component that is not correctly propagated to the input terminal "in" acts as noise on the terminal "in" from the viewpoint of the reference potential terminal VSFE.

The existence of the transmission line TL1 possibly causes a problem that the reflected component of noise propagated to the PD 2 is amplified to be imposed on the terminal "in" and the deterioration of the SNR increases.

There is a need for the present invention to provide an optical receiver and an optical transmission system capable of reducing noise on an input terminal from the viewpoint of the reference potential of the circuit and capable of decreasing a noise component superimposed on a signal to enhance the accuracy of the signal-to-noise ratio (SNR).

According to an embodiment of the present invention, there is provided an optical receiver including a light receiving element configured to have an anode and a cathode and generate a photocurrent dependent on received signal light, a current-voltage conversion circuit configured to be connected to the anode of the light receiving element and convert the photocurrent to a voltage signal, and a capacitive passive element configured to have a first electrode and a second electrode. The cathode of the light receiving element is connected to the first electrode of the capacitive passive element. The second electrode of the capacitive passive element is connected to a reference potential of the current-voltage conversion circuit and the second electrode is not coupled to objects other than a reference potential terminal of the current-voltage conversion circuit.

According to another embodiment of the present invention, there is provided an optical transmission system including an optical transmission line configured to transmit an optical signal, an optical signal transmitting device configured to transmit an optical signal to the optical transmission line, and an optical signal receiving device configured to include an optical receiver that receives an optical signal transmitted in the optical transmission line and converts the optical signal to an electrical signal. The optical receiver includes a light receiving element that has an anode and a cathode and generates a photocurrent dependent on received signal light, a current-voltage conversion circuit that is connected to the anode of the light receiving element and converts the photocurrent to a voltage signal, and a capacitive passive element having a first electrode and a second electrode. The cathode of the light receiving element is connected to the first electrode of the capacitive passive element. The second electrode of the capacitive passive element is connected to a reference potential of the current-voltage conversion circuit and the second electrode is not coupled to objects other than a reference potential terminal of the current-voltage conversion circuit.

According to these embodiments of the present invention, noise on an input terminal from the viewpoint of the reference potential of the circuit can be reduced. Thus, a noise component superimposed on a signal can be decreased and the accuracy of the signal-to-noise ratio (SNR) can be enhanced.

BRIEF DESCRIPTION OF THE DRAWINGS

FIGS. 13A to 13D are diagrams showing simulation results about the influence of noise at the reference potential terminal in the TIA of the optical receiver of FIG. 4 as a comparative example;

FIGS. 14A to 14D are diagrams showing simulation results about the influence of noise at the reference potential terminal in the TIA of the optical receiver according to the third embodiment; and FIG. 15 is a diagram showing the configuration of an optical receiver according to a fourth embodiment of the present invention.

DETAILED DESCRIPTION OF THE PREFERRED EMBODIMENTS

Embodiments of the present invention will be described below in association with the drawings.

The order of the description is as follows.
1. First Embodiment (first configuration example of optical receiver)
2. Second Embodiment (second configuration example of optical receiver)
3. Third Embodiment (third configuration example of optical receiver)
4. Fourth Embodiment (fourth configuration example of optical receiver)

Figure 5:
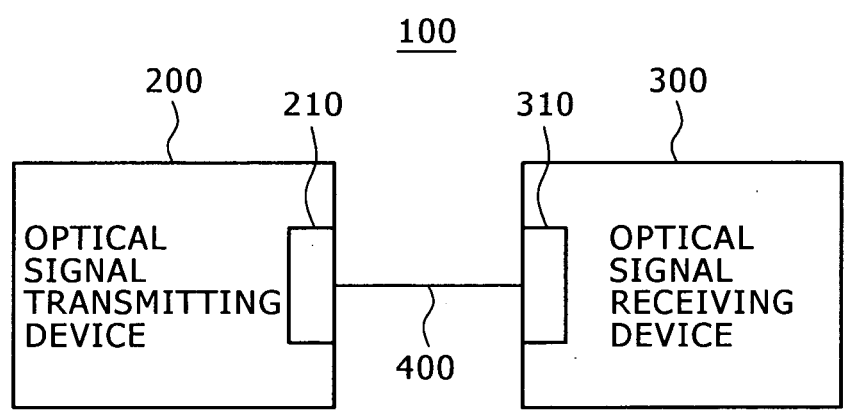
FIG. 5 is a diagram showing the basic configuration of an optical transmission system according to embodiments of the present invention.

FIG. 5 is a diagram showing the basic configuration of an optical transmission system according to the embodiments of the present invention.

This communication system 100 is configured with an optical signal transmitting device 200, an optical signal receiving device 300, and an optical transmission line 400.

The optical signal transmitting device 200 includes an optical transmitter 210 and an electrical signal output from this transmitter 210 is converted to an optical signal by an electro-optical conversion element, an LD or a VCSEL.

This optical signal is transmitted in the optical transmission line 400 formed of an optical fiber and subjected to opto-electrical conversion by a PD of an optical receiver (RX) 310 of the optical signal receiving device 300.

A specific description will be made below about the configuration and function of the optical receiver 310 of the optical signal receiving device 300 having characteristic configurations of the embodiments.

1. First Embodiment

Figure 6:
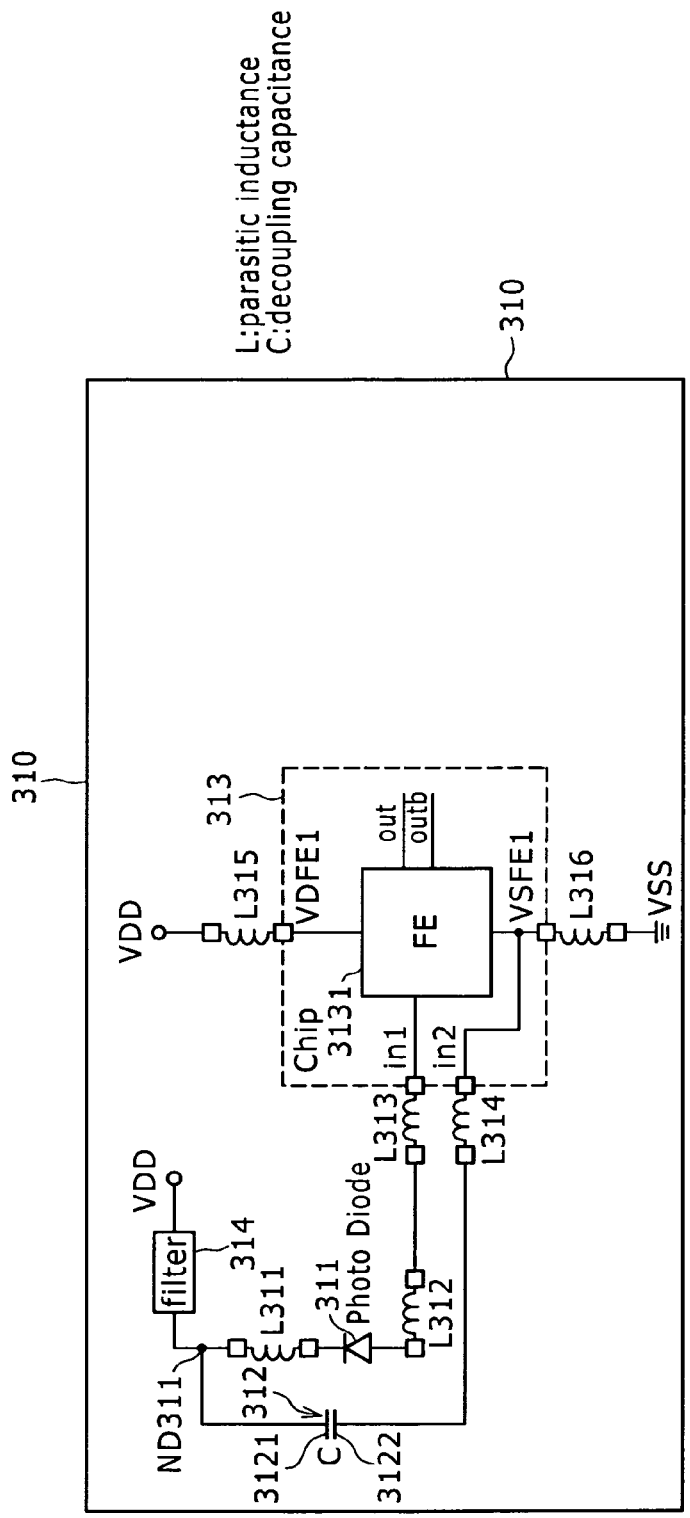
FIG. 6 is a diagram showing the configuration of an optical receiver according to a first embodiment of the present invention.

FIG. 6 is a diagram showing the configuration of an optical receiver according to a first embodiment of the present invention.

As shown in FIG. 6, the optical receiver 310 has a photodiode (PD) 311 as a light receiving element, a capacitor (C)

312 as a capacitive passive element, a TIA 313 as a current-voltage conversion circuit, and a filter 314.

In FIG. 6, L311 to L316 denote parasitic inductors and ND311 denotes a node.

The TIA 313 in FIG. 6 has input terminals in1 (first terminal) and in2 (second terminal), a power supply terminal VDFE1 connected to a power supply potential VDD, and a reference potential terminal VSFE1 connected to a reference potential VSS.

Furthermore, the TIA 313 includes a front end (FE) part 3131 connected to the input terminals in1 and in2, the power supply terminal VDFE1, and the reference potential terminal VSFE1.

For the TIA 313, the second terminal in2 and the reference potential terminal VSFE1 are connected to each other in the chip.

The cathode of the PD 311 is connected to the power supply potential VDD via the filter 314 and to a first electrode 3121 of the capacitor 312, and the node ND311 is formed by these connection points.

A second electrode 3122 of the capacitor 312 is connected to only the reference potential terminal VSFE1 via the terminal in2 of the TIA 313.

The parasitic inductor L311 exists between the cathode of the PD 311 and the node ND311.

The anode of the PD 311 is connected to the input terminal in1 of the TIA 313. The parasitic inductors L312 and L313 exist between the anode of this PD 311 and the input terminal in1 of the TIA 313.

The parasitic inductor L314 exists between the second electrode 3122 of the capacitor 312 and the terminal in2 of the TIA 313.

The parasitic inductor L315 exists between the power supply terminal VDFE1 of the TIA 313 and the power supply potential VDD, and the parasitic inductor L316 exists between the reference potential terminal VSFE1 and the reference potential VSS (e.g. ground potential GND).

As a characteristic of the optical receiver 310 of the present embodiment, the reference potential of the PD 311 is supplied from the reference potential terminal VSFE1 of the TIA 313 as the chip.

Figure 1:
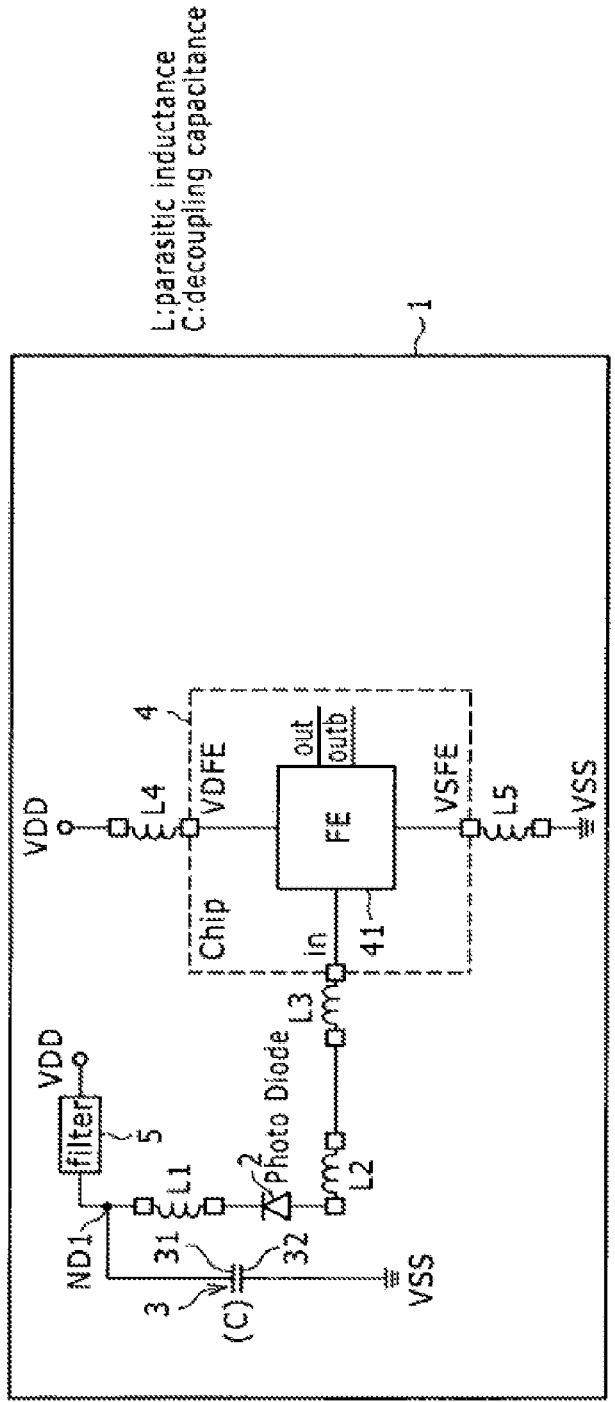
FIG. 1 is a diagram showing a first configuration example of an optical receiver and is a diagram showing a method for connecting a PD and a TIA generally used.
Figure 2:
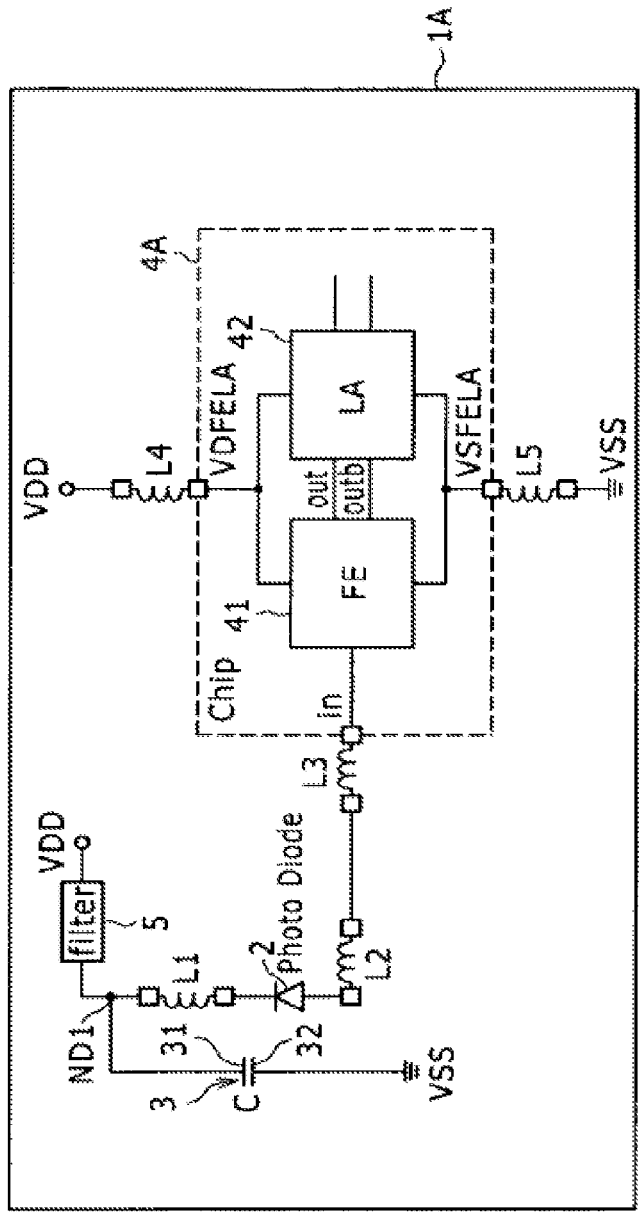
FIG. 2 is a diagram showing a second configuration example of the optical receiver.
Figure 3:
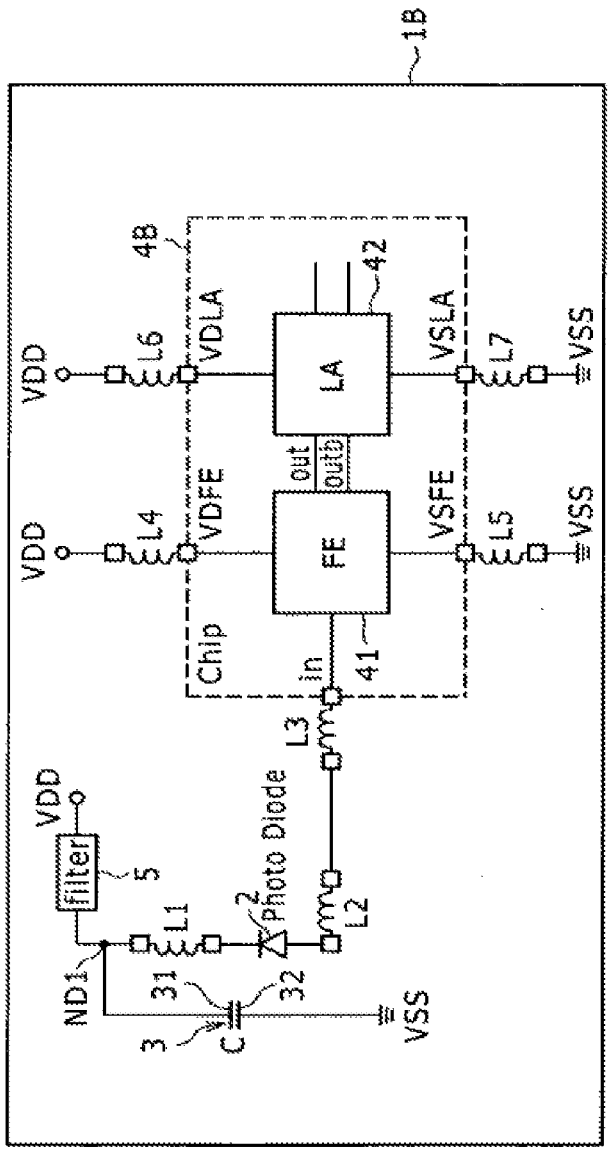
FIG. 3 is a diagram showing a third configuration example of the optical receiver.

In the optical receiver 1 of FIG. 1 as a comparative example, the return path between the PD 2 and the FE part 41 of the TIA 4 is continuous via the common GND.

In contrast, in the optical receiver according to the embodiment of the present invention, the return path between the PD 311 and the FE part 3131 is closed on the basis of the reference potential terminal VSFE1.

A consideration will be made below in association with FIG. 7 and FIG. 8 about the influence of noise at the reference potential terminal VSFE in the TIAs 313 and 4 in the optical receiver 310 according to the present embodiment and the optical receiver 1 of FIG. 1 as the comparative example.

Figure 7:
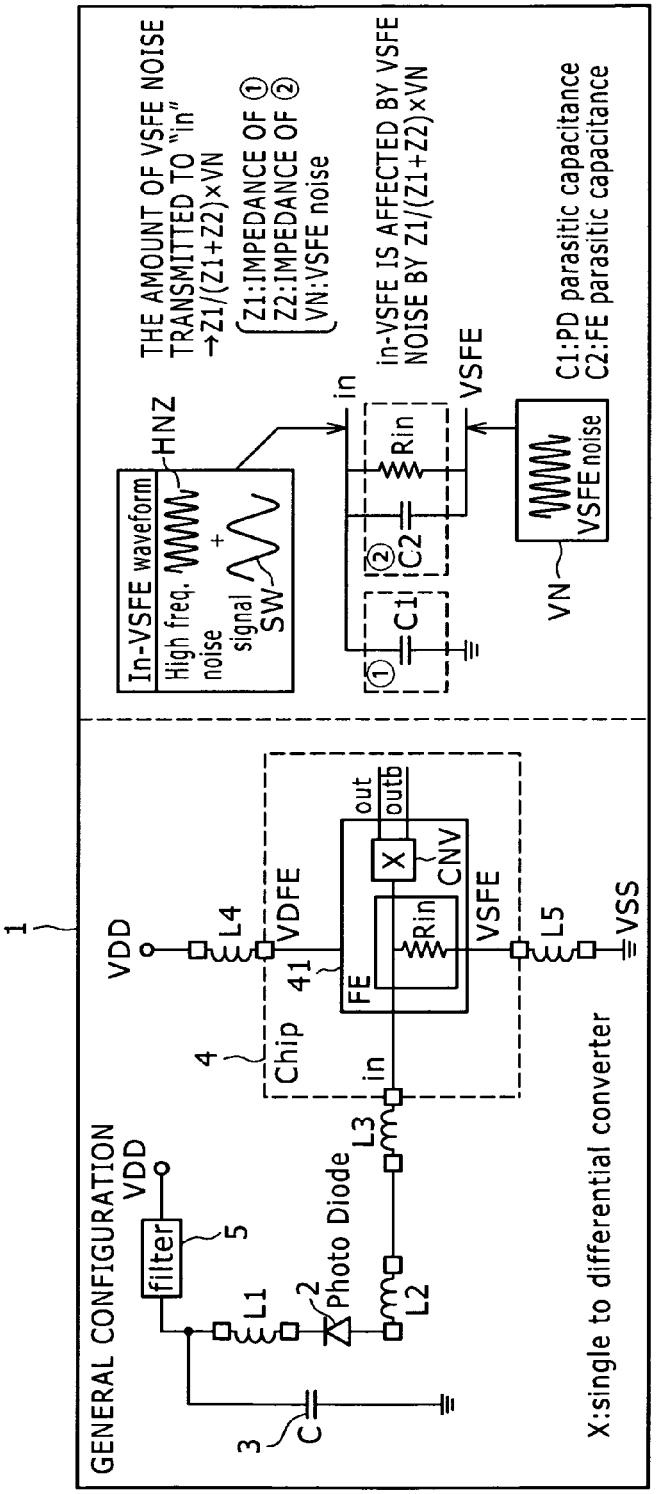
FIG. 7 is a diagram for explaining the influence of noise at a reference potential terminal in the TIA of the optical receiver of FIG. 1 as a comparative example.

FIG. 7 is a diagram for explaining the influence of noise at the reference potential terminal VSFE in the TIA 4 of the optical receiver 1 of FIG. 1 as the comparative example.

Figure 8:
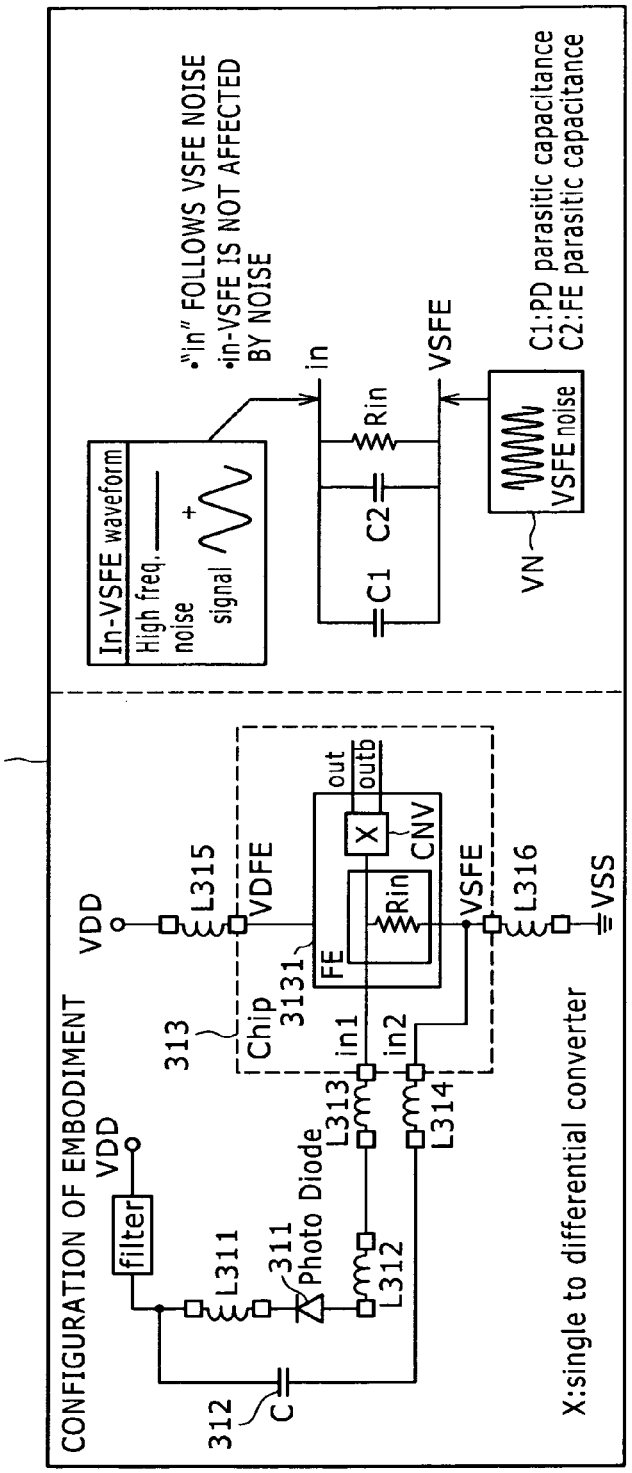
FIG. 8 is a diagram for explaining the influence of noise at the reference potential terminal in the TIA of the optical receiver according to the first embodiment.

FIG. 8 is a diagram for explaining the influence of noise at the reference potential terminal VSFE in the TIA 313 of the optical receiver 310 according to the present embodiment.

Referring to FIG. 7 and FIG. 8, in both of the FE parts 41 and 3131, a resistive element Rin is formed between the signal line and the reference potential terminal VSFE, and a converter CNV (X) to convert a single signal to differential signals "out" and "outb" is disposed at the output stage.

In FIG. 7 and FIG. 8, C1 denotes the parasitic capacitance of the PDs 2 and 311 and C2 denotes the parasitic capacitance of the FE parts 41 and 3131.

In the optical receiver 1 of FIG. 1 as the comparative example, the return path between the PD 2 and the FE part 41 of the TIA 4 is continuous via the common GND.

As a result, high-frequency noise HNZ is superimposed on a signal waveform SW in the TIA 4 of the optical receiver 1 of FIG. 1 as the comparative example.

If the impedance of the parasitic capacitance C1 of the PD 2 is defined as Z1, the impedance of the FE part 41 is defined as Z2 and noise at the reference potential terminal VSFE is defined as VN, the amount NZ of noise transmitted from the side of the reference potential terminal VSFE to the input terminal "in" is represented by the following equation.

$$NZ = \{Z1/(Z1+Z2)\} \times VN$$

As just described, in the optical receiver 1 of FIG. 1 as the comparative example, the path between the terminals in-VSFE is affected by the VSFE noise VN by $[Z1/(Z1+Z2) \times VN]$.

In contrast, in the optical receiver 310 according to the embodiment of the present invention, the return path between the PD 311 and the FE part 3131 is closed on the basis of the reference potential terminal VSFE.

As a result, the side of the input terminal "in" follows the VSFE noise VN and the path between the terminals in-VSFE is not affected by the noise in the TIA 313 of the optical receiver 310 according to the embodiment of the present invention.

As shown in FIG. 8, the high-frequency noise HNZ looks to be absent and the superposition thereof on the signal waveform SW is avoided.

FIGS. 9A to 9D and FIGS. 10A to 10D show simulation results about the influence of noise at the reference potential terminal VSFE in the TIAs 313 and 4 in the optical receiver 310 according to the first embodiment and in the optical receiver 1 of FIG. 1 as the comparative example.

FIGS. 9A to 9D are diagrams showing the simulation results about the influence of the noise at the reference potential terminal VSFE in the TIA 4 of the optical receiver 1 of FIG. 1 as the comparative example.

FIGS. 10A to 10D are diagrams showing the simulation results about the influence of the noise at the reference potential terminal VSFE in the TIA 313 of the optical receiver 310 according to the first embodiment.

FIGS. 9A to 9D and FIGS. 10A to 10D show the simulation results when noise is applied to the reference potential terminals VSFE and VSFE1 in the configurations of FIG. 1 and FIG. 6, respectively.

The waveform of the applied noise is a sine wave with amplitude of 1 mApp and a frequency of 761 MHz. The waveform of the input data is PRBS7 with amplitude of 10 μApp and a frequency of 5 Gbps. The parasitic inductance is 1 nH.

The waveforms of FIGS. 9A to 9C and FIGS. 10A to 10C show the voltages of the reference potential terminal VSFE, the path in-VSFE between the input terminal and the reference potential terminal, and the differential output out-outb, respectively.

Figure 9D:
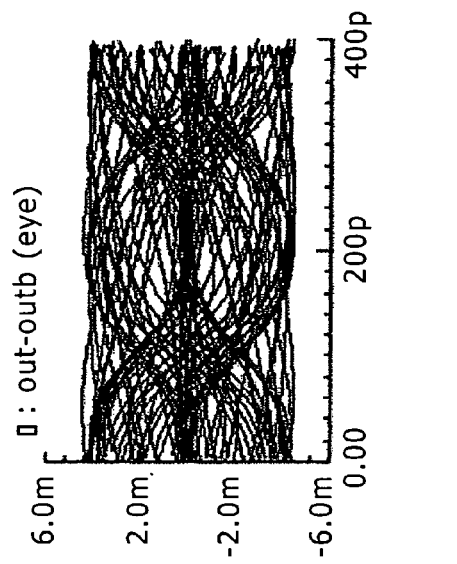
FIGS. 9A to 9D are diagrams showing simulation results about the influence of the noise at the reference potential terminal in the TIA of the optical receiver of FIG. 1 as the comparative example.
Figure 9A:
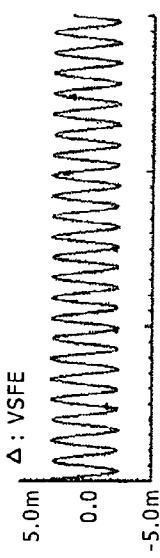
Figure 9B:
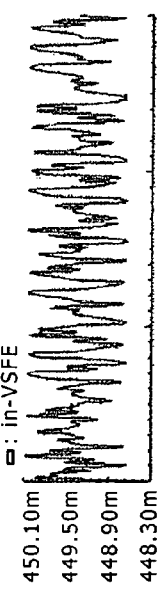
Figure 9C:
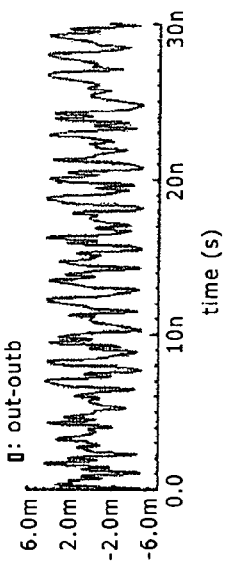
Figure 10D:
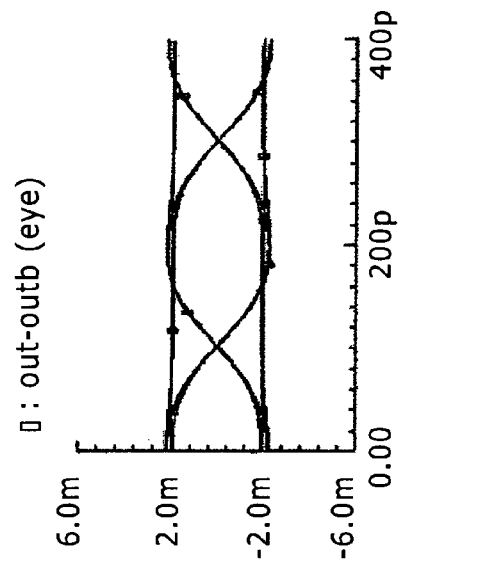
FIGS. 10A to 10D are diagrams showing simulation results about the influence of the noise at the reference potential terminal in the TIA of the optical receiver according to the first embodiment.
Figure 10A:
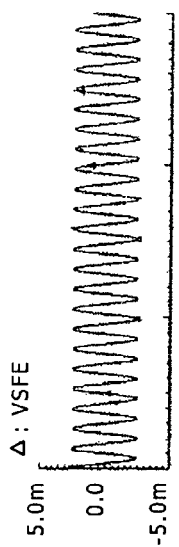
Figure 10B:
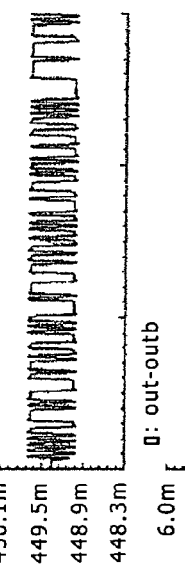
Figure 10C:
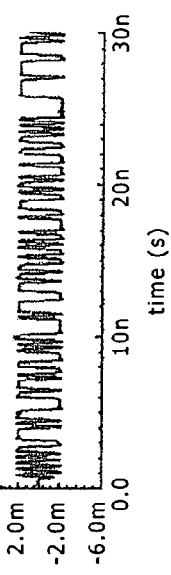

Each of FIG. 9D and FIG. 10D shows a so-called eye pattern that is the waveform pattern of the differential output out-outb.

The same circuits are used for the PDs and the FE parts in both of the configurations of FIG. 1 and FIG. 6.

In the optical receiver 1 of FIG. 1 as the comparative example, as shown in FIG. 9D, the eye pattern looks to be completely closed and the data is deteriorated due to the influence of the variation of the reference potential terminal VSFE.

In contrast, in the optical receiver 310 of FIG. 6 according to the first embodiment of the present invention, as shown in FIG. 10D, the data is not deteriorated although the amount of variation of the reference potential terminal VSFE is the same as that in the optical receiver 1 of FIG. 1.

As described above, according to the first embodiment, the return path between the PD 311 and the FE part 3131 is closed on the basis of the reference potential terminal VSFE1 in the optical receiver.

Due to this feature, the side of the input terminal "in" follows the VSFE noise VN and the path between the terminals in-VSFE is not affected by the noise. As a result, the noise component superimposed on the signal decreases and thus the accuracy of the signal-to-noise ratio (SNR) is enhanced.

The configuration of the first embodiment can be applied also to multiple channels. Whether the reference potential terminal VSFE1 of the multiple channels is common or separated, the technique of this configuration holds as long as the reference potential of the PD 311 is the same as that of the reference potential terminal VSFE1.

If the reference potential terminal VSFE1 of the multiple channels is separated for each one channel, noise is not imposed on the terminal "in" from the viewpoint of the reference potential terminal VSFE1 as with the above description.

Even when the reference potential terminal VSFE1 of the multiple channels is common, noise applied to the reference potential terminal VSFE1 is equally transmitted to the PDs 311 of the respective channels.

As a result, the terminals "in" of the respective channels also equally vary and thus the noise is not superimposed (not imposed) on the respective terminals "in" from the viewpoint of the reference potential terminal VSFE1.

2. Second Embodiment

Figure 11:
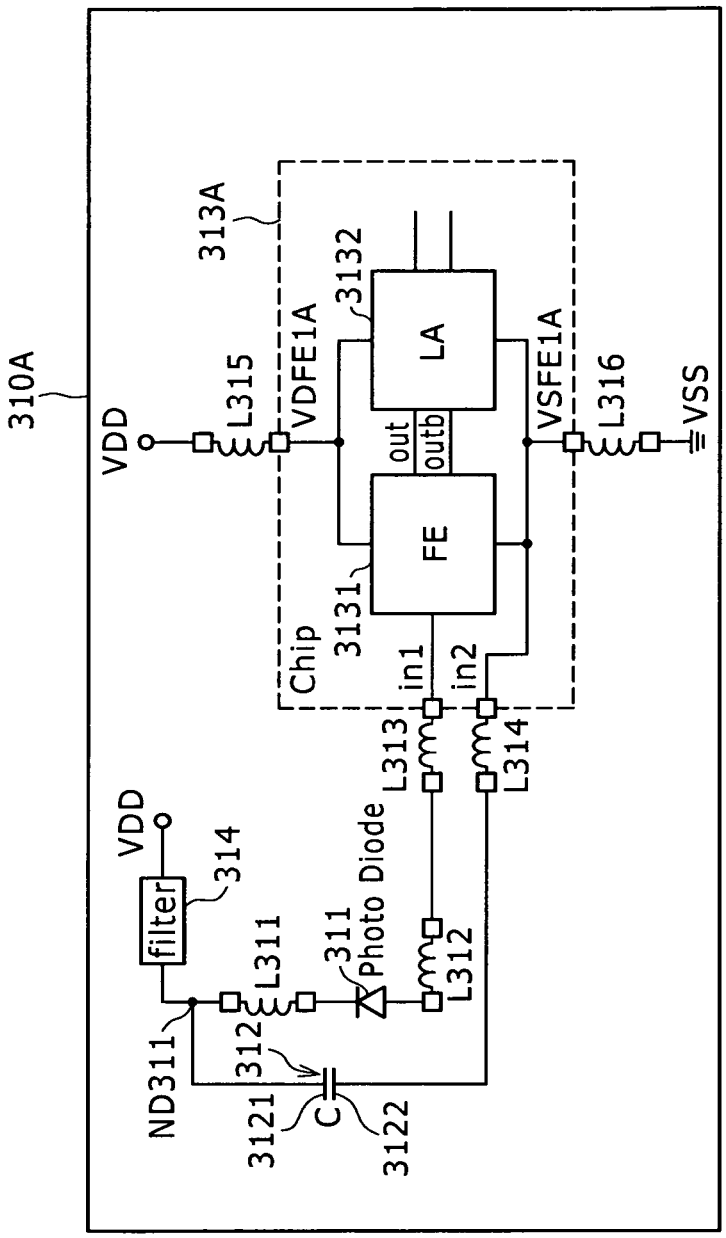
FIG. 11 is a diagram showing the configuration of an optical receiver according to a second embodiment of the present invention.

FIG. 11 is a diagram showing the configuration of an optical receiver according to a second embodiment of the present invention.

An optical receiver 310A according to the second embodiment is different from the optical receiver 310 according to the above-described first embodiment in that a limiting amplifier (LA) 3132 as a limiting circuit is disposed at the output stage of the FE part 3131 in a TIA 313A.

The LA 3132 and the FE part 3131 share a power supply terminal VDFE1A and a reference potential terminal VSFE1A.

In the optical receiver 310A according to the second embodiment, even when self-generated noise of the LA 3132 and so forth is applied to the reference potential terminal VSFE1A, the cathode potential of the PD 311 also varies by the same amount as that of variation of the reference potential terminal VSFE1A, and the potential of the terminal "in" also varies by the same amount as well.

Because the noise applied to the reference potential terminal VSFE1A is transmitted to the terminal "in" without deterioration, the potential of the terminal "in" from the viewpoint of the reference potential terminal VSFE1A is not affected by the noise.

The second embodiment can achieve the same advantageous effects as those of the above-described first embodiment.

3. Third Embodiment

Figure 12:
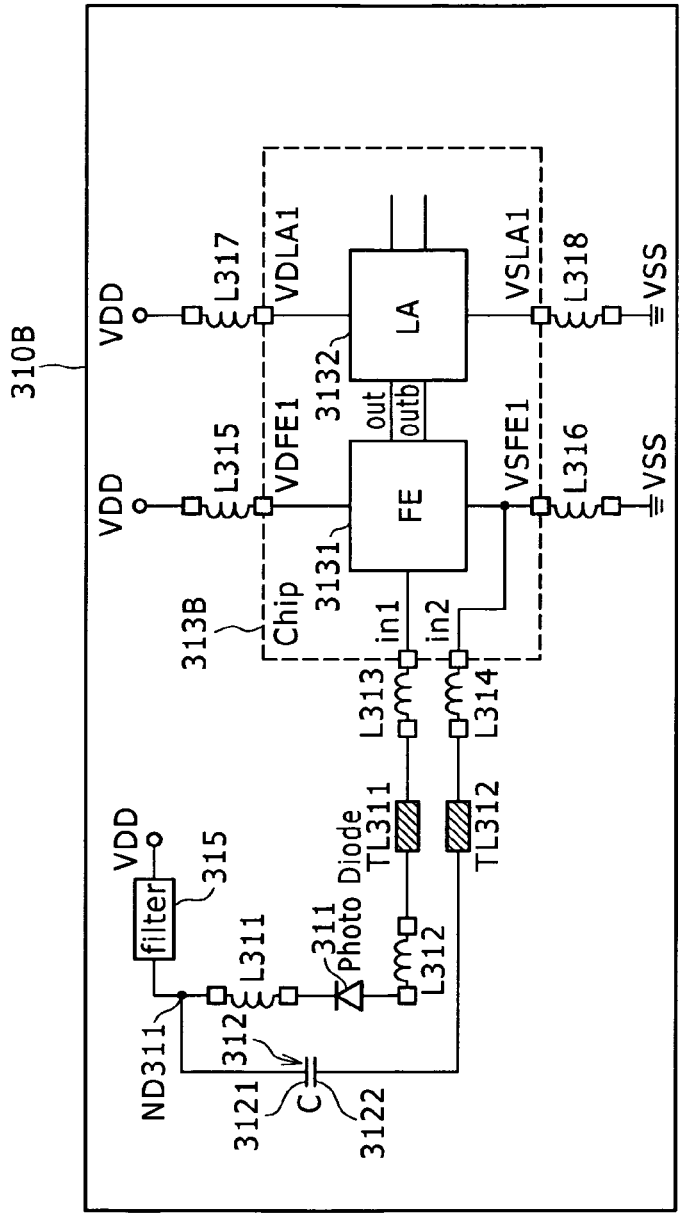
FIG. 12 is a diagram showing the configuration of an optical receiver according to a third embodiment of the present invention.

FIG. 12 is a diagram showing the configuration of an optical receiver according to a third embodiment of the present invention.

An optical receiver 310B according to the third embodiment is different from the optical receiver 310A according to the above-described second embodiment in the following point.

In the optical receiver 310B, a transmission line TL311 is formed between the PD 311 and the FE part 3131 of a TIA 313B and the reference potential of the PD 311 is supplied from the reference potential terminal VSFE1 of the TIA 313B as the chip.

Furthermore, in the optical receiver 310B, each of the FE part 3131 and the LA 3132 has the power supply terminal and the reference potential terminal separately.

The FE part 3131 is connected to the power supply potential VDD via the power supply terminal VDFE1 and connected to the reference potential VSS via the reference potential terminal VSFE1.

The LA 3132 is connected to the power supply potential VDD via the power supply terminal VDLA1 and connected to the reference potential VSS via the reference potential terminal VSLA1.

The parasitic inductor L315 exists between the power supply terminal VDFE1 of the TIA 313B and the power supply potential VDD, and the parasitic inductor L316 exists between the reference potential terminal VSFE1 and the reference potential VSS (e.g. ground potential GND).

The parasitic inductor L317 exists between the power supply terminal VDLA1 of the TIA 313B and the power supply potential VDD, and the parasitic inductor L318 exists between the reference potential terminal VSLA1 and the reference potential VSS (e.g. ground potential GND).

As a characteristic of the optical receiver 310B of the present embodiment, the transmission line TL 311 exists between the PD 311 and the FE part 3131 and the reference potential of the PD 311 is supplied from the reference potential terminal VSFE1 of the TIA 313B as the chip.

Figure 4:
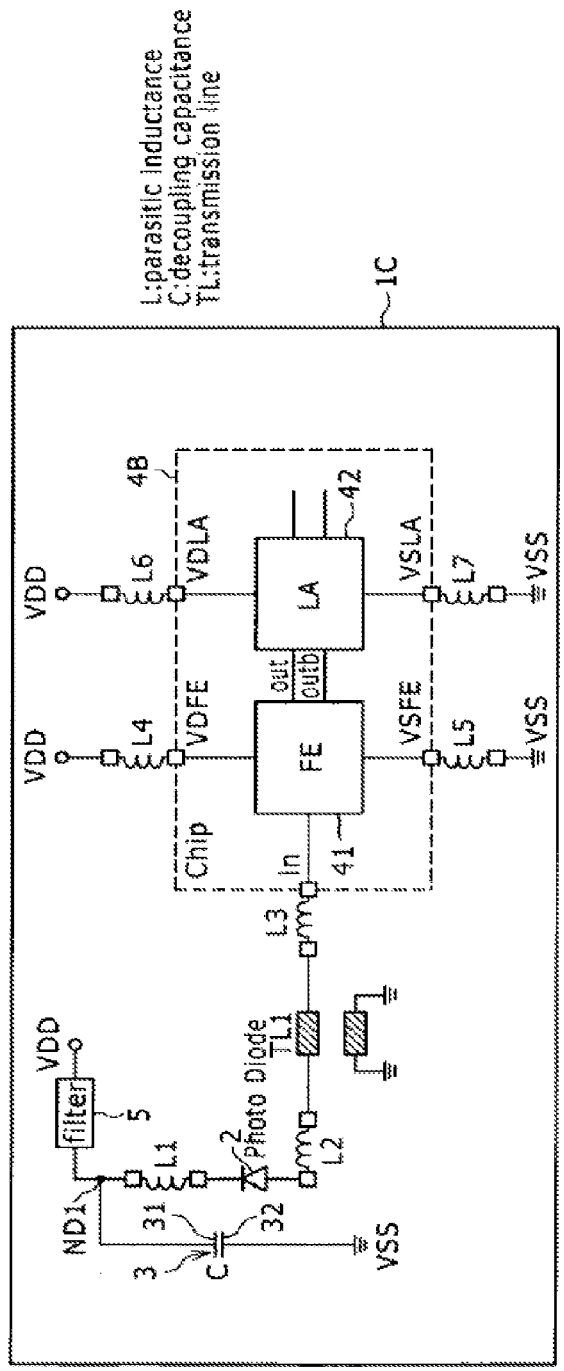
FIG. 4 is a diagram showing a fourth configuration example of the optical receiver and is a diagram showing a configuration in which the PD and a TIA chip are coupled to each other by a transmission line.

In the optical receiver 1C of FIG. 4 as a comparative example, the return path between the PD 2 and the FE part 41 of the TIA 4B is continuous via the common GND including the transmission line TL1.

In contrast, in the optical receiver 310B according to the embodiment of the present invention, the return path between the PD 311 and the FE part 3131 is closed on the basis of the reference potential terminal VSFE1 including the transmission line TL311.

In the optical receiver 310B according to the third embodiment, if self-generated noise of the LA 3132 and so forth is applied to the reference potential terminal VSFE1, noise is propagated to the PD 311 from both of the reference potential terminal VSFE1 and the terminal "in" via the transmission line TL311. Furthermore, the same amount of noise is imposed on the anode and cathode of the PD 311 and thus the noise is cancelled.

As a result, the terminal "in" from the viewpoint of the reference potential terminal VSFE1 is not affected by the noise.

FIGS. 13A to 13D and FIGS. 14A to 14D show simulation results about the influence of noise at the reference potential terminal VSFE in the TIAs 313B and 4B in the optical receiver 310B according to the present embodiment and in the optical receiver 1C of FIG. 4 as the comparative example.

FIGS. 13A to 13D are diagrams showing the simulation results about the influence of the noise at the reference potential terminal VSFE in the TIA 4B of the optical receiver 1C of FIG. 4 as the comparative example.

FIGS. 14A to 14D are diagrams showing the simulation results about the influence of the noise at the reference potential terminal VSFE1 in the TIA 313B of the optical receiver 310B according to the third embodiment.

FIGS. 13A to 13D and FIGS. 14A to 14D show the simulation results when noise is applied to the reference potential terminals VSFE and VSFE1 in the configurations of FIG. 4 and FIG. 12, respectively.

The waveform of the applied noise is a sine wave with amplitude of 1 mApp and a frequency of 761 MHz. The waveform of the input data is PRBS7 with amplitude of 10 μApp and a frequency of 5 Gbps. The parasitic inductance is 1 nH.

The waveforms of FIGS. 13A to 13C and FIGS. 14A to 14C show the voltages of the reference potential terminal VSFE, the path in-VSFE between the input terminal and the reference potential terminal, and the differential output out-outb, respectively.

Each of FIG. 13D and FIG. 14D shows a so-called eye pattern that is the waveform pattern of the differential output out-outb.

The same circuits are used for the PDs and the FE parts in both of the configurations of FIG. 4 and FIG. 12.

In the optical receiver 10 of FIG. 4 as the comparative example, as shown in FIG. 13D, the eye pattern looks to be completely closed and the data is deteriorated due to the influence of the variation of the reference potential terminal VSFE.

In contrast, in the optical receiver 310B of FIG. 12 according to the third embodiment of the present invention, as shown in FIG. 14D, the data is not deteriorated although the amount of variation of the reference potential terminal VSFE1 is the same as that in the optical receiver 10 of FIG. 4.

As described above, according to the third embodiment, the transmission line TL311 exists between the PD 311 and the FE part 3131, and the return path between the PD 311 and the FE part 3131 is closed on the basis of the reference potential terminal VSFE1 including the transmission line TL311 in the optical receiver.

As a result, noise is propagated to the PD 311 from both of the reference potential terminal VSFE1 and the terminal "in" via the transmission line TL311. Furthermore, the same amount of noise is imposed on the anode and cathode of the PD 311 and thus the noise is cancelled.

Therefore, the terminal "in" from the viewpoint of the reference potential terminal VSFE1 is not affected by the noise.

As a result, the noise component superimposed on the signal decreases and thus the accuracy of the signal-to-noise ratio (SNR) is enhanced.

The configuration of the third embodiment can be applied also to multiple channels. Whether the reference potential terminal VSFE1 of the multiple channels is common or separated, the technique of this configuration holds as long as the reference potential of the PD 311 is the same as that of the reference potential terminal VSFE1 including the transmission line.

If the reference potential terminal VSFE1 of the multiple channels is separated for each one channel, noise is not imposed on the terminal "in" from the viewpoint of the reference potential terminal VSFE1 as with the above description.

Even when the reference potential terminal VSFE1 of the multiple channels is common, noise applied to the reference potential terminal VSFE1 is propagated to the PD 311 from both of the reference potential terminal VSFE1 and the terminal "in" via the transmission line.

As a result, the same amount of noise is imposed on the anode and cathode of the PD 311 and thus the noise is cancelled. Therefore, the terminal "in" from the viewpoint of the reference potential terminal VSFE1 is not affected by the noise.

4. Fourth Embodiment

FIG. 15 is a diagram showing the configuration of an optical receiver according to a fourth embodiment of the present invention.

An optical receiver 310C according to the fourth embodiment is different from the optical receiver 310B according to the above-described third embodiment in the following point.

In the optical receiver 310C of FIG. 15, which is the same as the optical receiver 310B of FIG. 12 as the equivalent circuit, transmission lines are formed by using a signal line SGL as a first layer and a floating plane 315 as a second layer.

Over a board 316, the floating plane 315 and an ideal ground 317 are disposed in parallel.

Furthermore, the PD 311, the capacitor 312, and the transmission line TL311 are formed on the floating plane 315 and an end part in which the terminals in1 and in2 of the TIA 313B as the chip are formed is disposed on the floating plane 315.

To the terminal in1, the transmission line TL311 formed of the signal line SGL of the first layer is connected.

The second electrode 3122 of the capacitor 312 and the terminal in2 are connected to the floating plane 315 of the second layer by a pad.

The fourth embodiment can achieve the same advantageous effects as those of the above-described third embodiment.

The present application contains subject matter related to that disclosed in Japanese Priority Patent Application JP 2010-139586 filed in the Japan Patent Office on Jun. 18, 2010, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:
1. An optical receiver comprising:
a light receiving element configured to have an anode and a cathode and generate a photocurrent dependent on received signal light;
a current-voltage conversion circuit configured to be connected to the anode of the light receiving element and convert the photocurrent to a voltage signal; and
a capacitive passive element configured to have a first electrode and a second electrode, wherein
the cathode of the light receiving element is connected to the first electrode of the capacitive passive element, and
the second electrode of the capacitive passive element is connected to a reference potential of the current-voltage conversion circuit and the second electrode is not coupled to objects other than a reference potential terminal of the current-voltage conversion circuit, wherein
the current-voltage conversion circuit includes
a first terminal connected to the anode of the light receiving element,
a second terminal connected to the second electrode of the capacitive passive element,
a power supply terminal connected to a power supply potential, and
the reference potential terminal connected to the reference potential, and the second terminal is connected to the reference potential terminal via a connection path contained within the current-voltage conversion circuit, wherein the second electrode of the capacitive passive element is directly connected to the second terminal, is indirectly connected to the reference potential terminal via the connection path, and is not directly connected to the reference potential terminal.

2. The optical receiver according to claim 1, wherein the current-voltage conversion circuit includes a front end part that is connected to the first terminal, the power supply terminal, and the reference potential terminal and converts a current supplied from the first terminal to a differential voltage.

3. The optical receiver according to claim 2, wherein the current-voltage conversion circuit has a limiting circuit to limit a level of a differential voltage output from the front end part, and the front end part and the limiting circuit share the power supply terminal and the reference potential terminal.

4. The optical receiver according to claim 2, wherein the current-voltage conversion circuit has a limiting circuit to limit a level of a differential voltage output from the front end part, and the power supply terminal and the reference potential terminal are formed for each of the front end part and the limiting circuit separately.

5. An optical transmission system comprising:
an optical transmission line configured to transmit an optical signal;
an optical signal transmitting device configured to transmit an optical signal to the optical transmission line; and
an optical signal receiving device configured to include an optical receiver that receives an optical signal transmitted in the optical transmission line and converts the optical signal to an electrical signal, wherein
the optical receiver includes
    a light receiving element that has an anode and a cathode and generates a photocurrent dependent on received signal light,
    a current-voltage conversion circuit that is connected to the anode of the light receiving element and converts the photocurrent to a voltage signal, and
    a capacitive passive element having a first electrode and a second electrode,
the cathode of the light receiving element is connected to the first electrode of the capacitive passive element, and
the second electrode of the capacitive passive element is connected to a reference potential of the current-voltage conversion circuit and the second electrode is not coupled to objects other than a reference potential terminal of the current-voltage conversion circuit, wherein
the current-voltage conversion circuit includes
    a first terminal connected to the anode of the light receiving element,
    a second terminal connected to the second electrode of the capacitive passive element,
    a power supply terminal connected to a power supply potential, and
    the reference potential terminal connected to the reference potential, and
the second terminal is connected to the reference potential terminal via a connection path contained within the current-voltage conversion circuit,
wherein the second electrode of the capacitive passive element is directly connected to the second terminal, is indirectly connected to the reference potential terminal via the connection path, and is not directly connected to the reference potential terminal.

6. The optical transmission system according to claim 5, wherein
the current-voltage conversion circuit includes a front end part that is connected to the first terminal, the power supply terminal, and the reference potential terminal and converts a current supplied from the first terminal to a differential voltage.

7. The optical transmission system according to claim 6, wherein
the current-voltage conversion circuit has a limiting circuit to limit a level of a differential voltage output from the front end part, and
the front end part and the limiting circuit share the power supply terminal and the reference potential terminal.

8. The optical transmission system according to claim 6, wherein
the current-voltage conversion circuit has a limiting circuit to limit a level of a differential voltage output from the front end part, and
the power supply terminal and the reference potential terminal are formed for each of the front end part and the limiting circuit separately.

9. The optical transmission system according to claim 5, wherein
a first transmission line exists between the light receiving element and the current-voltage conversion circuit, and
a second transmission line is formed based on a terminal connected to the second electrode of the capacitive passive element and the reference potential of the current-voltage conversion circuit.

10. The optical transmission system according to claim 9, wherein
the first transmission line is formed of a signal line of a first layer, and
the second transmission line is formed of a floating plane that is a second layer.

11. The optical receiver according to claim 1, wherein
a first transmission line exists between the light receiving element and the current-voltage conversion circuit, and
a second transmission line is formed based on a terminal connected to the second electrode of the capacitive passive element and the reference potential of the current-voltage conversion circuit.

12. The optical receiver according to claim 11, wherein
the first transmission line is formed of a signal line of a first layer, and
the second transmission line is formed of a floating plane that is a second layer.

13. An optical receiver comprising:
a current-voltage conversion circuit connected to an anode of a light receiving element, the light receiving element being configured to generate a photocurrent dependent on received signal light and the current-voltage conversion circuit being configured to convert photocurrent from the light receiving element to a voltage signal; and
a capacitive passive element including a first electrode and a second electrode, the first electrode being connected to a cathode of the light receiving element, wherein
the current-voltage conversion circuit includes
    a first terminal connected to an anode of the light receiving element,
    a second terminal connected to the second electrode of the capacitive passive element,
    a power supply terminal connected to a power supply potential, and the reference potential terminal connected to the reference potential, and the second electrode of the capacitive passive element is connected to the reference potential terminal of the current-voltage conversion circuit via a connection path contained within the current-voltage conversion circuit, wherein the second electrode of the capacitive passive element is directly connected to the second terminal, is indirectly connected to the reference potential terminal via the connection path, and is not directly connected to the reference potential terminal.

14. The optical receiver according to claim 13, wherein the second electrode of the capacitive passive element is connected only to the reference potential terminal of the current-voltage conversion circuit.

15. The optical receiver according to claim 14, further comprising
a first transmission line connecting the light receiving element and the current-voltage conversion circuit, and
a second transmission line connecting the second electrode of the capacitive passive element and the reference potential of the current-voltage conversion circuit.

16. The optical receiver according to claim 15, wherein the first transmission line is formed of a signal line of a first layer, and
the second transmission line is formed of a floating plane that is of a second layer.

17. The optical receiver according to claim 13, wherein the current-voltage conversion circuit includes a front end part that is connected to the first terminal, the power supply terminal, and the reference potential terminal and converts a current supplied from the first terminal to a differential voltage.

18. The optical receiver according to claim 17, wherein the current-voltage conversion circuit has a limiting circuit to limit a level of a differential voltage output from the front end part, and
the front end part and the limiting circuit share the power supply terminal and the reference potential terminal.

19. The optical receiver according to claim 17, wherein the current-voltage conversion circuit has a limiting circuit to limit a level of a differential voltage output from the front end part, and
the power supply terminal and the reference potential terminal are formed for each of the front end part and the limiting circuit separately.

20. An optical transmission system comprising:
an optical transmission line configured to transmit an optical signal;
an optical signal transmitting device configured to transmit an optical signal to the optical transmission line; and
an optical signal receiving device including the optical receiver according to claim 13.

* * * * *